United States Patent [19]

Brassat et al.

[11] 3,989,677

[45] Nov. 2, 1976

[54] PROCESS FOR THE PRODUCTION OF POLYAMIDES

[75] Inventors: Bert Brassat; Rolf Brockmann, both of Krefeld, Germany

[73] Assignee: Bayer Aktiengesellschaft, Leverkusen, Germany

[22] Filed: Nov. 15, 1974

[21] Appl. No.: 524,272

[30] Foreign Application Priority Data

Nov. 17, 1973 Germany............................ 2357568

[52] U.S. Cl............................ 260/78 L; 260/78 P; 260/78 S; 264/176 F; 264/211
[51] Int. Cl.².......................................... C08G 69/46
[58] Field of Search ............... 260/78 L, 78 P, 78 S; 264/176 F, 211

[56] References Cited
UNITED STATES PATENTS

| | | | |
|---|---|---|---|
| 2,731,081 | 1/1956 | Mayner.......................... | 260/78 L X |
| 2,904,109 | 9/1959 | Malm............................. | 260/78 L X |
| 3,015,651 | 1/1962 | Kjellmark...................... | 260/78 L |
| 3,753,955 | 8/1973 | Haylock et al.................. | 260/78 L |

FOREIGN PATENTS OR APPLICATIONS 2,115,297  10/1971  Germany........................... 260/78 L Primary Examiner—Lucille M. Phynes
Attorney, Agent, or Firm—Plumley and Tyner

[57] ABSTRACT

An improved process for the production of polyamides of low extract content by the activated anionic polymerisation of at least one lactam containing at least 5 ring members at temperatures above the melting point of the polyamide in a continuously working polymerisation apparatus, optionally followed directly by shaping, the improvement comprises treating the polyamide melt obtained by polymerising said lactam in said polymerisation apparatus with water or steam and subsequently freeing it from volatile constituents by evaporation before the polyamide melt is discharged into the open.

9 Claims, No Drawings

PROCESS FOR THE PRODUCTION OF POLYAMIDES

This invention relates to a process for the production of polyamides of low extract content by the continuous activated anionic polymerisation of lactams accompanied by evaporation of the low molecular weight constituents.

It is known that lactams may be polymerised in the presence of strong bases to form polyamides. In many cases, this anionic polymerisation process affords advantages over the hydrolytic polymerisation of lactams. The anionic polymerisation of lactams takes place extremely quickly, especially in the presence of so-called "activators", i.e. compounds with an acylating effect, or their reaction products with lactams (DT-PS No. 1,067,591; U.S. Pat. No. 3,015,652). By virtue of this high polymerisation velocity, the activated anionic polymerisation of lactams provides an effective basis for the continuous production of polyamides in high volume-time yields. Continuous processes of this type are known, for example activated anionic polymerisation in tube reactors (German Pat. No. 50,002) or in extruders (for example Czechoslovakia Pat. No. 97,332; Great Britian Pat. No. 944,307; Great Britian Pat. No. 986,678). In this way, the polyamide may be processed, for example into extruded profiles, immediately after its production, so that all stages of the process from the monomeric lactam to the finished polyamide profile may be carried out in a single operation and, hence, particularly economically.

The disadvantage of these processes is that, hitherto, there has been no commercially satisfactory possibility of removing the low molecular weight constituents of the polymer during the continuous process. It is known that the polymerisation of lactams is not a complete reaction, but instead results in an equilibrium state in which the polymer formed still contains extractable low molecular weight constituents, such as unreacted lactam and its oligomers, collectively referred to hereinafter as "extract". The quantitative composition of the reaction mixture in the equilibrium state is governed both by the type of lactam being polymerised and by the polymerisation temperature. For example, the polymerisation of ε-caprolactam at 220° C gives a polyamide with an extract content of about 9%. Any increase in the polymerisation temperature is accompanied by an increase in the extract content. This applies both to hydrolytic polymerisation and to activated anionic polymerisation.

The low molecular weight constituents modify the properties of the polyamide obtained and, accordingly, represent an undesirable secondary constituent. For example, caprolactam acts as a plasticiser in polyamide-6; its ring-shaped oligomers make the material brittle. In addition, the extract tends to emigrate from the polyamide by and by and to form an unattractive, grey coating over the surface of the material. The greasy feel of these substances, their intensely bitter taste and the irritation some of them cause to mucous membrane, adversely affect the marketability of extract-containing polyamides to a considerable extent. Accordingly, these polyamides have to be extracted after production. On an industrial scale, this is done in batches by boiling the polyamide for several hours with water. This procedure is both complicated and laborious. Since, in any industrial process, throughput is governed by the slowest process stage, polyamide production as a whole could be rationalised by accelerating the removal of the extract, making it continuous and combining it into a single operation with one of the continuous polymerisation processes referred to above.

Accordingly, it has been repeatedly proposed to improve the anionic polymerisation processes carried out in continuous cycle apparatus, more especially extruders, by passing the molten polymer through an evaporation zone in which the low molecular weight constituents are evaporated and removed under suction or driven off by an inert entraining gas (German Pat. No. 1,495,133; German Pat. No. 1,495,658; German Pat. No. 1,770,320; U.S. Pat. No. 3,371,055; U.S. Pat. No. 3,484,414; Great Britian Pat. No. 986,678). Thus it is possible to considerably reduce the initial extract content. In practice, however, the efficiency of this process is limited because, immediately after the low molecular weight constituents have been evaporated off, the disturbed chemical equilibrium begins to re-establish itself. This results in the reformation of the troublesome low molecular weight constituents which have just been removed. In every case, reformation takes place so quickly above the melting temperature of the polyamide-6 that the extract content virtually reaches its original level again before the polymer is able to pass through the extrusion die and to cool.

One method of obviating these disadvantages is described in German Pat. No. 2,115,297 = Great Britian Pat. No. 1,323,963. In this case, lactam polymerisation is carried out at temperatures below the melting point of the polyamide so that a low-extract polymer is obtained. Before processing, the polymers are treated with water or steam inter alia after size-reduction. In this way, the catalyst still present in the polymer which is responsible for reformation of the monomers is destroyed so that the polyamide may be processed into moulding articles at temperatures above its melting point without any danger of a relatively high extract content being formed by any monomer reformation.

Although according to this process polyamides with a low extract content are obtained, the process does have several disadvantages. Since the polymer accumulates in solid form it has to be size-reduced before treated with water in order to obtain as complete a destruction of the catalyst as possible. Size-reduction involves an additional operation which uses a lot of energy because of the extreme toughness of the polyamides. Despite size-reduction, however, the polymer has to be brought into contact with an excess of water for an average of 1 hour. As a result of this excess treatment with water, the polymer is in danger of degrading during melting. Another disadvantage of the process referred to above is that polymerisation cannot be carried out in a standard polymerisation apparatus, such as an extruder, because it takes place at temperatures considerably below the melting temperature of the polyamide formed. Another disadvantage is that, for processing, the polyamide has to be remelted to another, separate operation which uses a lot of energy.

The object of the present invention is to obviate the disadvantages referred to above and to provide a process for the activated anionic polymerisation of lactams in which polyamide of low extract content is obtained.

Accordingly, the invention relates to an improved process for the production of polyamides of low extract content by the activated anionic polymerisation of at least one lactam containing at least 5 ring members at temperatures above the melting point of the polyamide in a continuously working polymerisation apparatus, optionally followed directly by shaping, the improvement comprises treating the polyamide melt obtained by polymerising said lactam in said polymerisation apparatus with water or steam and subsequently freeing it from volatile constituents by evaporation, optionally carried out in vacuo or by means of an entraining gas before the polyamide melt is discharged into the open.

During the brief exposure of the polyamide melt to the action of water, for on average, from 0.5 to 5 minutes and preferably from 1 to 2 minutes it is surprising that the water could completely destroy the anionic catalyst present in the polymer. Thus surprisingly the degradation into low molecular weight compounds could be prevented in very short time, although treatment times of, on average, 1 hour are required for the conditioning with water according to German Pat. No. 2,115,295 = Great Britian Pat. 1,323,963. Since the destruction of the catalyst is accompanied by the formation of hydroxides, such as sodium hydroxide, which promote hydrolytic degradation by the water present, monomer reformation through hydrolysis had to be expected to occur in view of the high reaction temperatures prevailing in the processing machine. In spite of this fact, polyamides with an extract content of at most 5%, on average 2 to 3.5%, are surprisingly obtained.

Finally, another surprising factor is that removal of the extract is more complete at elevated temperatures than at low temperatures, although the extract content and hydrolytic degradation rate increase with increasing temperature.

The polymerisation process according to the invention may be carried out with lactams having at least 5 ring members, preferably caprolactam, lauric lactam, α-pyrrolidone, oenanthic lactam, capryllactam, the corresponding C-substituted lactams and with lactam mixtures containing several of these lactams.

Polymerisation is carried out in the presence of conventional catalysts for the anionic polymerisation of lactams, such as alkali metal and alkaline-earth metal lactamates and alcoholates, alkali metal or alkaline-earth metal salts of fatty acids or of C-H-acid compounds, such as Na-ε-caprolactamate, Na- and potassium formate and Na-methylate. The catalyst is used in quantities of from 0.2 to 2 mol % and preferably in a quantity of 0.4 mol %, based on the lactam.

Suitable activators are monoisocyanates and polyisocyanates, masked isocyanates, triazines, ketenes, carbodiimides, acid imides, acid chlorides and the reaction products of these substances with lactams, such as phenyl isocyanate, tolylene-1,4-diisocyanate, hexamethylene-1,6-diisocyanate, caprolactam-N-carboxylic acid-N'-phenylamide, hexamethylene-1,6-bis-(carbamido caprolactam), triphenoxy-s-triazine, N-stearoyl caprolactam. The activator is used in quantities of from 0.02 to 1 mol % and preferably in quantities of from 0.2 to 0.3 mol %, based on the lactam.

The polymerisation reaction may be carried out in the presence of chain terminators, pigments, fillers and strengtheners, mould-release and nuclearising agents and other additives. The process may be carried out in continuous polymerisation apparatus, such as standard ram or screw extruders, tube reactors and combinations thereof. The apparatus is fed either with the reactive lactam melt or with the corresponding solid mixture, followed by heating beyond the melting point of the polyamide formed, i.e. to 170° – 350° C. On completion of polymerisation, the polymeric melt is treated with water or steam in the same polymerisation apparatus or in a shaping tool fixedly connected to it. The water is generally metered through pumps in a quality at least equivalent to the quantity of catalyst used. It is preferably used in a 5 to 20 fold excess, and with particular preference in a 10 fold excess. After the melt has been exposed to the water for an average 0.5 minutes to 5 minutes, preferable for 1 to 2 minutes, during which it can continue to move through the apparatus, the volatile constituents are evaporated off through an evacuation outlet. A vacuum of from 10 to 100 Torr is preferably applied. It may also be of advantage to evaporate the volatile constituents by means of an inert entraining gas, for example nitrogen. A polyamide discharged into the open may be directly processed into granulate. Mouldings produced from the granulate surprisingly have the same low extract content as the polyamide granulate used. However, the polymerisation apparatus may also be designed in such a way that polyamide mouldings are directly obtained by the process according to the invention, so that there is no need to isolate the granulate between polymerisation and shaping. In either case, the process according to the invention eliminates the need for prolonged extraction of the polyamide granulate with water.

Additives may also be added to the polymerisable mixture during or after polymerisation. Examples of additives of the type in question are inorganic or organic pigments or dyes such as carbon black, $TiO_2$ or phthalocyanines, plasticisers or mould-release agents, inorganic or organic fibres, such as glass fibres or mats or asbestos fibres, also fillers, such as glass beads, calcium carbonate or bentonite, flameproofing additives, such as red phosphorus, organic halogen compounds, phosphoric acid esters or metal oxides and blowing agents, such as azides or hydrocarbons.

EXAMPLE 1

A twin-screw extruder with two 50 mm diameter, 1800 mm long screws rotating in the same direction consists of 6 equally long barrel sections heatable independently of one another. The first compression zone is situated at the beginning of the second barrel section. The fifth barrel section is in the form of a vacuum zone followed by recompression. In the middle of the fourth section, the barrel has a bore through which water may be sprayed in by means of a metering pump. A strand die is used as the extrusion die. The feed zone is charged with a powdered mixture of the following composition:

1100 parts by weight of caprolactam
10 parts by weight of hexamethylene-1,6-bis-(carbamido caprolactam)
5 parts by weight of sodium caprolactamate
4 parts by weight of N-benzyl acetamide The extruder is operated at a throughput of 15 kg/hour in accordance with the following temperature programme: water-cooled feed zone/200° C/250° C/250° C/250° C/250° C/die 250° C. The polyamide strand run off is cooled in water and granulated.

If a vacuum of 20 Torr is applied to the vacuum zone by means of a water ring pump, and if water is sprayed in at a rate of 50 ml per hour through the bore in the barrel wall, a polyamide granulate with a residual extract content of 3.3 to 3.7% (as determined by the method described in Kunststoffhandbuch, published by H. Vieweg, Vol. 6 "Polyamide", chapter 4.7) is obtained.

EXAMPLE 2 (COMPARISON EXAMPLE)

The procedure is as in Example 1 except that no water is sprayed in. A polyamide granulate with an extract content of 10.0 to 10.7% is obtained.

EXAMPLE 3 (COMPARISON EXAMPLE)

The procedure is as in Example 1, except that no vacuum is applied and no water sprayed in. A polyamide granulate with an extract content of 10.9 to 11.6% is obtained.

EXAMPLE 4

A twin-screw extruder with two 55 mm diameter screws rotating in the same direction was used as the test apparatus. Its barrel (length = 40 times the diameter) has 6 individually controllable heating zones. Zone 5 is in the form of a vacuum zone. At the beginning of the fourth zone, the screws have a short return thread with a length equal to the diameter; otherwise they have a constant lead, apart from the deviations required for expansion and recompression in the vacuum zone. In the fourth zone, the barrel has a bore with a nozzle screwed into it through which water may be sprayed in by means of a metering pump. The extrusion die is in the form of a strand die. The feed opening of the extruder is closed. In stead two metering pumps supply the feed zone through two bores in the barrel with two liquid mixtures whose admixture in the barrel produces the polymerisable melt. They have the following composition:

Component A:
275 parts by weight of $\epsilon$-cparolactam
2 parts by weight of hexamethylene diisocyanate
11 parts by weight of behenic acid-N-cyclohexylamine Component B:
275 parts by weight of $\epsilon$-caprolactam
3 parts by weight of sodium caprolactamate Both components are introduced in a weight ratio of 1 : 1. Their entry temperature is 100° C. The work may rate of the metering pumps is adapted to the troughput of the extruder which amounts to 20 kg per hour. The barrel temperature of the extruder is 180° C in the feed zone and 250° C in all other zones. The die temperature is also 250° C. A pressure of 10 Torr prevails in the vacuum zone.

The polyamide strand run off is cooled in water and granulated. The extract content of the polyamide granulate thus produced is determined in the same way as in Example 1. The test is carried out with different quantities of water sprayed in per unit of time. The following Table shows the extract content of the polyamide obtained in dependence upon the water injection rate:

| ml of H$_2$O per hour | none | 10 | 25 | 50 | 100 | 150 |
|---|---|---|---|---|---|---|
| Extract content % | 11.1 | 9.2 | 4.6 | 4.2 | 4.7 | 3.9 |

EXAMPLE 5

The procedure is as in Example 4 except that the caprolactam in both components of the polymerisable melt is replaced by a mixture of caprolactam and lauric lactam. The extruder is operated with the following temperature programme: feed zone 180° C; zones 2 and 3: 210° C; zones 4 and 5: 260° C; zone 6 and die: 230° C. The water is sprayed in at a rate of 50 ml per hour. The remaining test conditions are the same as in Example 4. The following Table shows the extract content of some of the mixed polyamides obtained with and without injection of water.

| Lauric lactam content of the starting lactam mixture (% by weight) | 30 | 40 | 50 |
|---|---|---|---|
| Extract content with water injection % | 3.6 | 3.4 | 3.7 |
| Extract content without water injection % | 15.4 | 17.9 | 22.1 |

EXAMPLE 6

The procedure is as in Example 4, except that the water is sprayed in at a rate of 50 ml per hour, and the barrel temperature in zones 4 and 5 is varied. All other test parameters remain unchanged. The following Table shows the extract content of the polyamide obtained in this way with and without injection of water and the dependence upon the temperature prevailing in the injection and vacuum zone.

| Barrel temperature in zone 4-5 (° C) | 250 | 270 | 290 | 300 | 320 |
|---|---|---|---|---|---|
| Extract content with water injection (%) | 4.2 | 3.5 | 2.9 | 2.7 | 2.3 |
| Extract content without water injection (%) | 11.1 | 12.1 | 13.9 | 14.2 | 15.1 |

EXAMPLE 7

A tube reactor 3 meters long with an internal diameter of 50 mm, heated to a temperature of 240° C, is used as the polymerisation apparatus. It is fed by two metering pumps with equal quantities of two caprolactam melts one of which contains 0.8% of sodium caprolactamate and the other 1.0% of phenyl isocyanate and 0.8% of N-benzylacetamide in dissolved form. Both melts are kept at 100° C and mix on entering the tube reactor. The pumps each have an output of 12.5 kg per hour.

After polymerisation, the melt flows under pressure through a valve into the feed opening of a single-screw extruder with a screw diameter of 45 mm and a length of 12 times the diameter. It is equipped with an evacuable evaporation zone. Before the vacuum zone the barrel has a bore through which water is sprayed in at a rate of 70 ml per hour by means of a metering pump. The barrel temperature is kept at 270° C, the pressure in the vacuum zone amounting to 10 Torr. A solid bar 80 mm in diameter is extruded. The material has good mechanical properties and an extract content of 3.2%.

EXAMPLE 8 (COMPARISON EXAMPLE)

The procedure is as in Example 7, except that no water is sprayed into the extruder barrel. The material obtained has an extract content of 10.9% and is much softer and more flexible than that obtained in accordance with Example 7.

EXAMPLE 9

A single-screw extruder with a screw diameter of 45 mm and a length of 25 times the diameter is used as the polymerisation apparatus. It is fitted with a conventional five-zone screw and an evacuable evaporation zone. Between the first compression zone and the vacuum zone, the barrel has a bore through which water is sprayed in at a rate of 50 ml per hour by means of a metering pump. The extrusion die is in the form of a strand die. The feed zone, heated to 110° C, is charged by a single-shaft feed screw 20 mm in diameter and 10 times in diameter long, which is rotated at 60 rpm and whose barrel is heated to 80° C, with a mixture of the following composition:

1100 parts by weight of caprolactam
4 parts by weight of sodium caprolactamate
8 parts by weight of caprolactam-N-carboxylic acid anilide
350 parts by weight of short glass fibres The extruder is charged at a rate of 12 kg per hour. The barrel temperature of the extruder, except in the feed zone, is 260° C. Water is sprayed into the barrel through the injection nozzle at a rate of 30 ml per hour. The pressure in the vacuum zone amounts to 15 Torr. A strand is extruded and, after extrusion, is cooled in water and granulated. It has an extract content of 2.9%.

EXAMPLE 10 (COMPARISON EXAMPLE)

The procedure is as in Example 9, except that no water is spayed in. The extruded polyamide has an extract content of 10.2%.

EXAMPLE 11

The test described in Example 1 is repeated with the following polymerisable mixture:

200 parts by weight of lauric lactam
5 parts by weight of sodium caprolactamate
12 parts by weight of hexamethylene-1,6-bis-(carbamidocaprolactam)
2 parts by weight of N-cyclohexylbenzamide
15 parts by weight of stearic acid-N-cyclohexylamide The temperature programme is modified as follows: water-cooled feed zone/170° C/260° C/260° C/260° C/250° C/die 250° C. The other test parameters are unchanged. A polyamide-12 granulate with an extract content of 0.8% is obtained.

EXAMPLE 12 (COMPARISON EXAMPLE)

The procedure is as in Example 11, except that no water is sprayed into the barrel. A polyamide-12 with an extract content of 2.7% is obtained.

EXAMPLE 13

The test described in Example 1 is repeated with the difference that the low molecular weight substances evaporating in the evaporation zone are not evacuated by a vacuum pump, but instead are removed by blowing in a vigorous stream of nitrogen. The polyamide granulate obtained has an extract content of 6.9%.

EXAMPLE 14

The test described in Example 13, is repeated with the difference that no water is sprayed into the extruder barrel. The polyamide granulate obtained had an extract content of 11.0%.

EXAMPLE 15

The tube reactor described in Example 7 opens into a 2 m long flanged-on tube of the same diameter which, at its front end, has a bore for an injection nozzle, followed by static mixing elements which guarantee thorough dispersion of the water injected in the polyamide melt. Water is sprayed in at a rate of 70 ml per hour. The tube reactor and mixing tube are heated to 240° C. Subsequent evaporation of the low molecular weight constituents takes place in a vacuum falling-film evaporator 600 mm in diameter and 1500 mm long heated to a temperature of 250° C. The melt is discharged into the open through a discharge screw. A strand is spun from the melt, being cooled in water and granulated. The material contains 3.6% of extract.

EXAMPLE 16 (COMPARISON EXAMPLE)

The procedure is as in Example 15, except that no water is sprayed in. A polyamide granulate with an extract content of 10.2% is obtained.

We claim:

1. In a process for the production of polyamides of low extract content by activated anionic polymerisation of at least one lactam containing at least 5 ring members at a temperature above the melting point of the polyamide in a continuously working polymerisation apparatus comprising an extruder, the improvement comprising treating the polyamide melt obtained by polymerising said lactam in said extruder with water or steam for an average time of from about 0.5 to about 5 minutes before the polyamide melt is discharged into the open; and subsequently freeing the melt from volatile constituents by evaporation.

2. A process as claimed in claim 1, wherein the moldable polyamide melt is treated with water or steam for from 0.5 to 5 minutes.

3. A process as claimed in claim 2, wherein the treatment time is from 1 to 2 minutes.

4. A process as claimed in claim 1, wherein the lactam is caprolactam, lauric lactam, α-pyrrolidone, oenanthic lactam, capryllactam, or the corresponding C-substituted lactam, or mixtures thereof.

5. A process as claimed in claim 1, wherein said polymerisation apparatus is a ram or screw extruder or a tube reactor.

6. A process as claimed in claim 1, wherein a 5 to 20 fold excess of water or steam is used, based on the quantity of catalyst.

7. A process as claimed in claim 1, wherein the volatile constituents are evaporated off by the action of a vacuum or of an entraining gas.

8. A process as claimed in claim 7, wherein a vacuum of from 10 to 100 Torr is applied.

9. A process as claimed in claim 7, wherein the entraining gas is nitrogen.

* * * * *